E. H. GOLD.
HEATING SYSTEM FOR SLEEPING CARS.
APPLICATION FILED MAY 11, 1918.
1,404,360.
Patented Jan. 24, 1922.
5 SHEETS—SHEET 3.
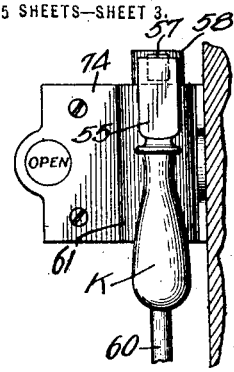
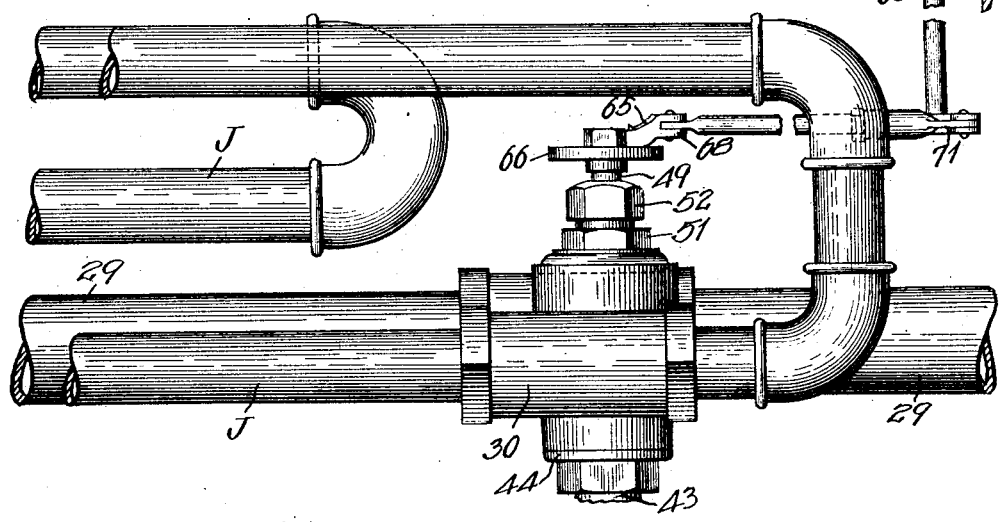
Fig. 3.
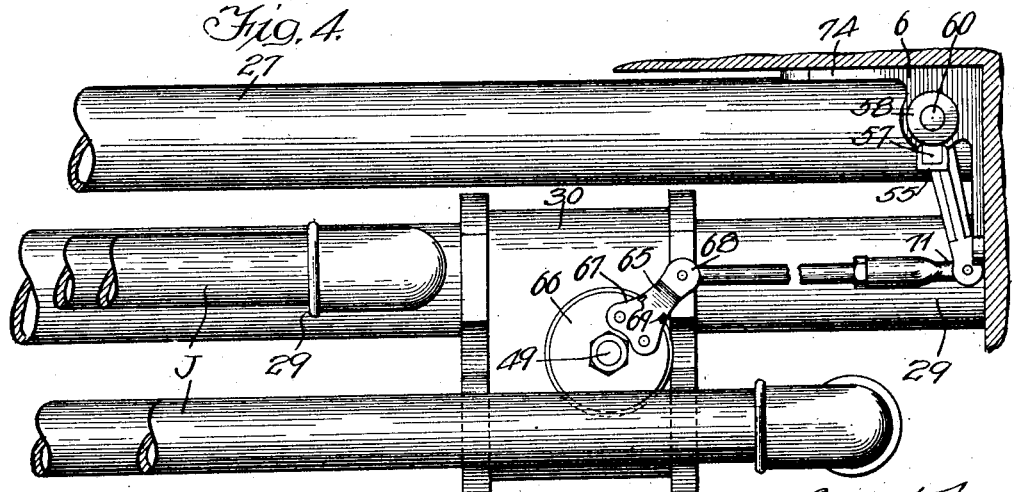
Fig. 4.

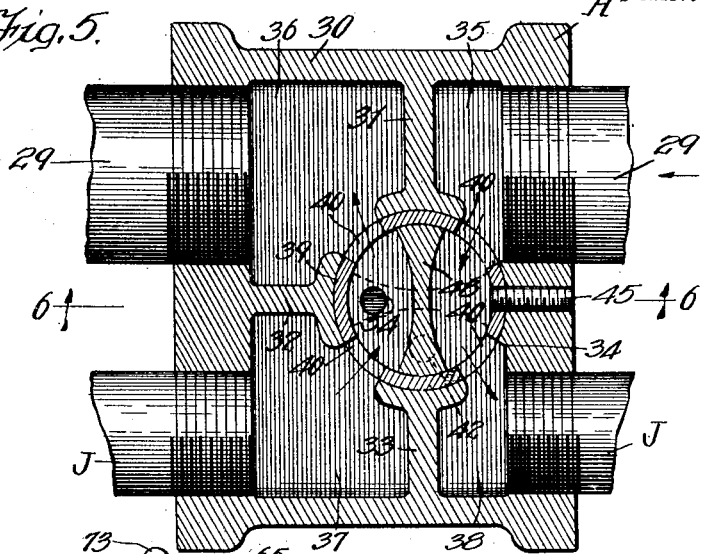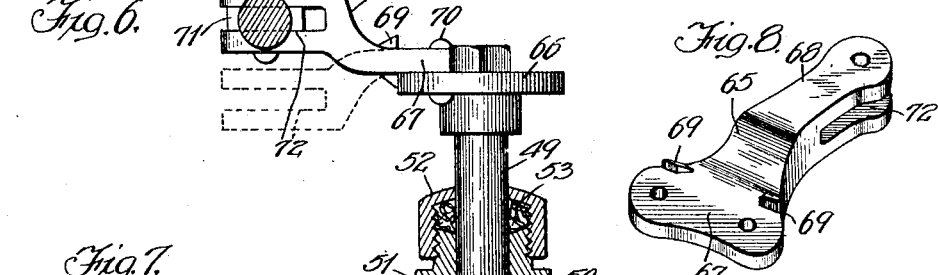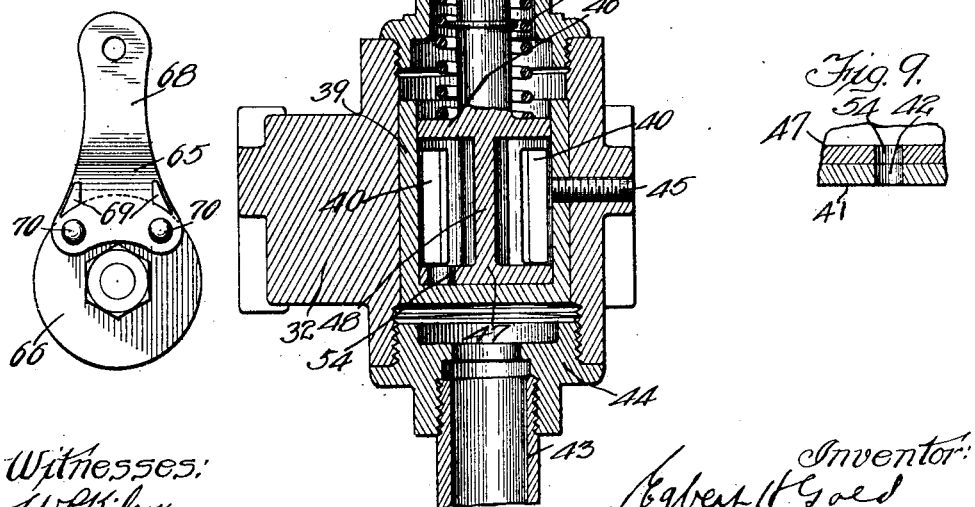

E. H. GOLD.
HEATING SYSTEM FOR SLEEPING CARS.
APPLICATION FILED MAY 11, 1918.
1,404,360.
Patented Jan. 24, 1922.
5 SHEETS—SHEET 5.
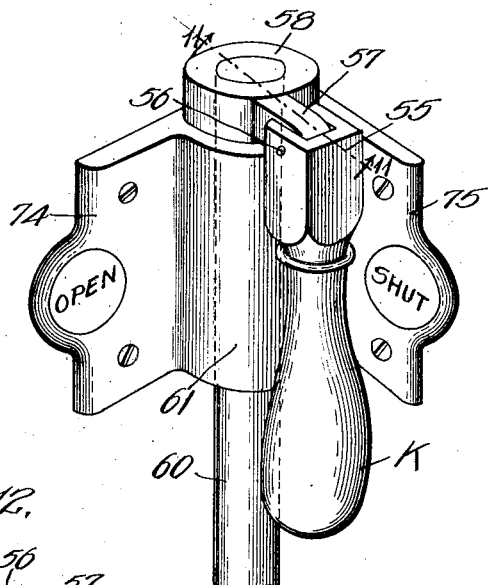
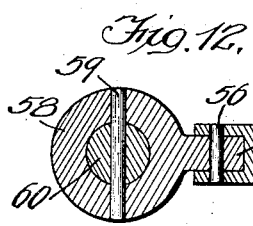
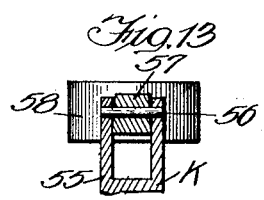
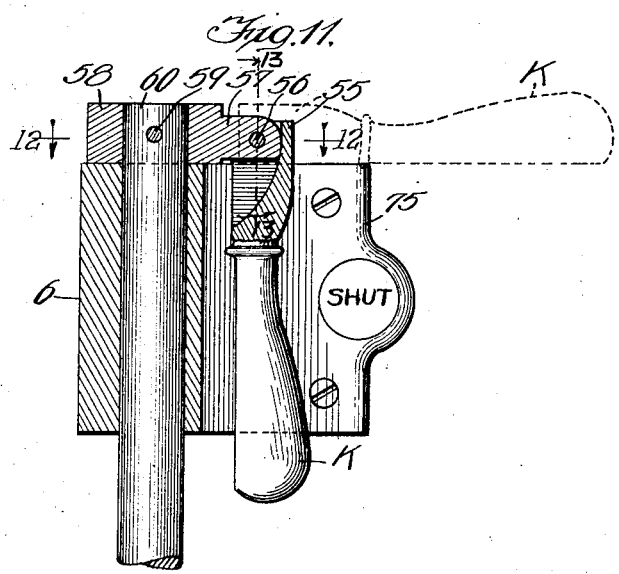

UNITED STATES PATENT OFFICE.

EGBERT H. GOLD, OF CHICAGO, ILLINOIS.

HEATING SYSTEM FOR SLEEPING CARS.

1,404,360.     Specification of Letters Patent.    Patented Jan. 24, 1922.

Application filed May 11, 1918. Serial No. 233,928.

*To all whom it may concern:*

Be it known that I, EGBERT H. GOLD. a citizen of the United States, residing at Chicago, in the county of Cook and State of Illinois, have invented certain new and useful Improvements in Heating Systems for Sleeping Cars, of which the following is a specification.

My invention relates to a low pressure or vapor steam heating system for sleeping cars, and the primary object of the invention is to provide for a sleeping car having the usual seating sections which are made up as berths at night, a heating system of the type indicated, which will be capable of delivering to the sections of the car separately amounts of heat that may be regulated, in each case, by the occupant of the lower berth of the section in case the section is made up.

A further object of the invention is to provide a heating apparatus of the character just described which will take up but little room in the car and can be inexpensively manufactured and installed.

A further object is to provide in a sleeping car a heating system having separate section radiators a radiating circuit for the entire car the flow of steam through which is unaffected by manipulation of the control valves for the section radiators so that even though all of the section radiators are cut out enough heat will be supplied to the car to warm the corridors and keep the water pipes and other water fixtures from freezing.

The invention consists in the new and improved constructions and devices to be hereinafter described and claimed for carrying out the above stated objects and such other incidental objects as will appear from the following description of a preferred embodiment of my invention.

This embodiment is illustrated in the accompanying drawings in which—

Fig. 3 is a view, in elevation, of the heating arrangements for one of the sections.

Fig. 4 is a plan view of the parts shown in Fig. 3.

Fig. 5 is a sectional plan of the controlling valve employed in connection with each of the section radiating coils, the same type of valve being used preferably in certain other places in the heating system.

Fig. 6 is a vertical section on line 6—6 of Fig. 5.

Fig. 7 is a plan view showing the end of the valve stem and the operating crank connected therewith.

Fig. 8 is a view, in perspective, of the operating crank.

Fig. 9 is a detail sectional view of the lower part of the valve member and associated part of the casing with the valve member in the reverse position from that shown in Figs. 5 and 6, this view being for the purpose of showing the manner in which the drip port in the valve registers with a corresponding opening in the casing.

Fig. 10 is a perspective view of the handle for controlling the valve shown in Figs. 5 and 6 and of certain parts associated with said handle.

Fig. 11 is a sectional view on line 11—11 of Fig. 10, and

Figs. 12 and 13 are detail sections on lines 12—12 and 13—13, respectively, of Fig. 11.

Like characters of reference designate like parts in the several figures of the drawings.

The proper heating of a sleeping car presents difficulties which arise out of the fact that the seating or berth portion of a sleeping car constitutes in the day time a single compartment which at night, after the berths have been made up, is divided into a number of different compartments. Furthermore, when the sections are made up the lower berth comes quite close to the heating coils which are commonly arranged along the sides of the car near the floor so that the lower berths of the car, which are more frequently occupied than the upper berths, are likely to be overheated or at least overheated during the first part of the night for it frequently happens that by morning the berths are too cold for comfort in dressing. It is necessary to keep a certain amount of radiating surface in the car active in order to heat the corridors and keep water pipes and fixtures from freezing up. To avoid any difficulty on this score the porter frequently overheats the entire car and even when arrangements are made for making a part of the heating system inactive during the night hours the objection still remains that some of the passengers will want more heat during the night than others, and will wish to have the additional or supplemental heat turned on earlier or later than others. My invention, a typical form of which will now be described, provides a heating system which, without neglecting the general heating of the car, permits the occupants of the sections or berths to control, within certain limits, the amount of heat delivered to the portion of the car which they severally occupy.

Figure 1:
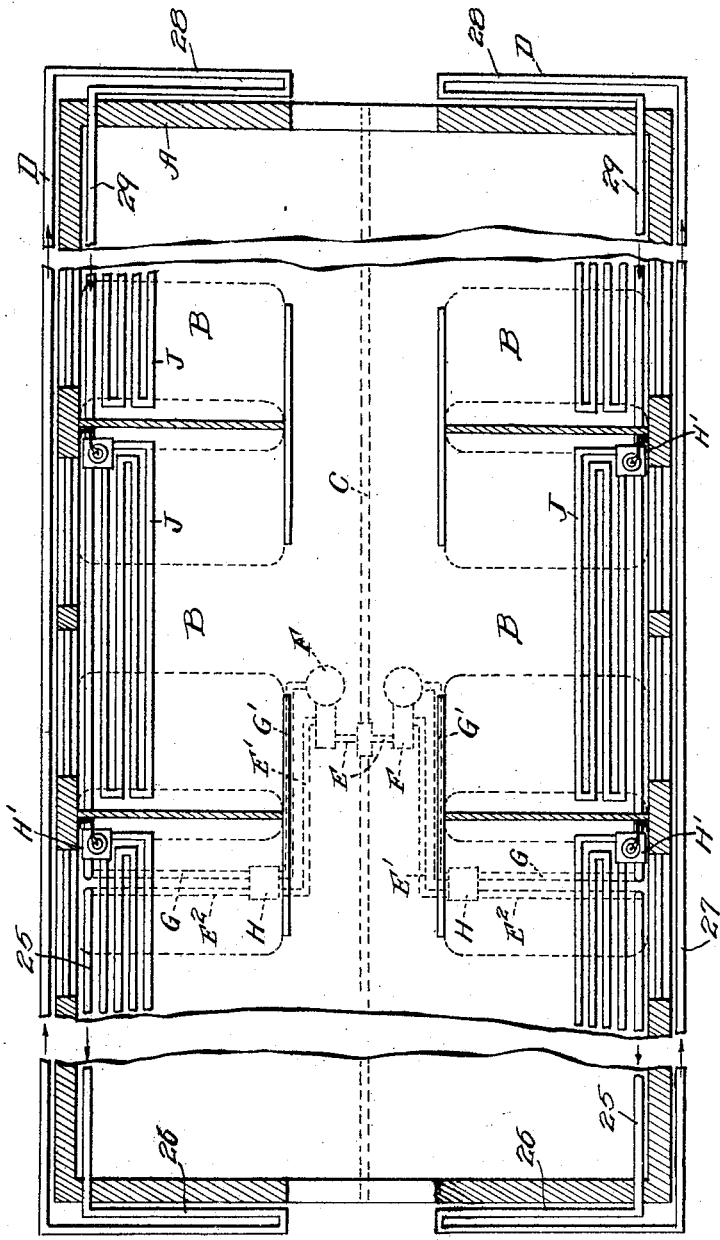
Fig. 1 is a diagrammatic, fragmentary sectional plan of a sleeping car showing the general arrangement of the elements of the heating system.

Referring to the drawings, the car structure is indicated at A. The sections are designated generally by the letters B. C is the steam train pipe and D the main radiating coil which extends preferably the entire length of the car and is arranged so as to protect the water pipes and water fixtures from freezing. These pipes and fixtures are not shown as it is assumed that they are located in the customary places in the car. There are two main radiating coils D, one on each side of the car. As the arrangements on opposite sides of the car are ordinarily identical reference will be made to the parts of the apparatus associated with the main heating coil at one side of the car. In Fig. 1 of the drawings, which shows the heating arrangements on both sides of the car, the same reference characters will be used for corresponding parts of both sets of apparatus.

The main radiating coil D is supplied with steam from train pipe C through a pipe E, E', E². Interposed between pipe sections E and E' is a vapor regulator F which may be of any ordinary construction, the function of this device being to maintain steam in the radiating elements associated with supply pipe E, E', E², at substantially atmospheric pressure by means of a thermostat located so as to be under the influence of medium outflowing from radiator D through a pipe which has been indicated in the drawings by characters G, G'. Interposed between pipe sections E' and E² and pipe sections G', G is a four-way valve H (Figs. 5 and 6), the function of which is to direct the low pressure steam from pipe section E' either into pipe section E² and the medium outflowing from the radiating elements from pipe section G to pipe section G' and to the thermostat of vapor regulator F, or to cut out the radiating elements and short circuit the steam from pipe section E directly to pipe section G' and back to the vapor regulator so as to keep the latter from freezing up; these arrangements forming no part, in themselves, of my present invention.

Figure 2:
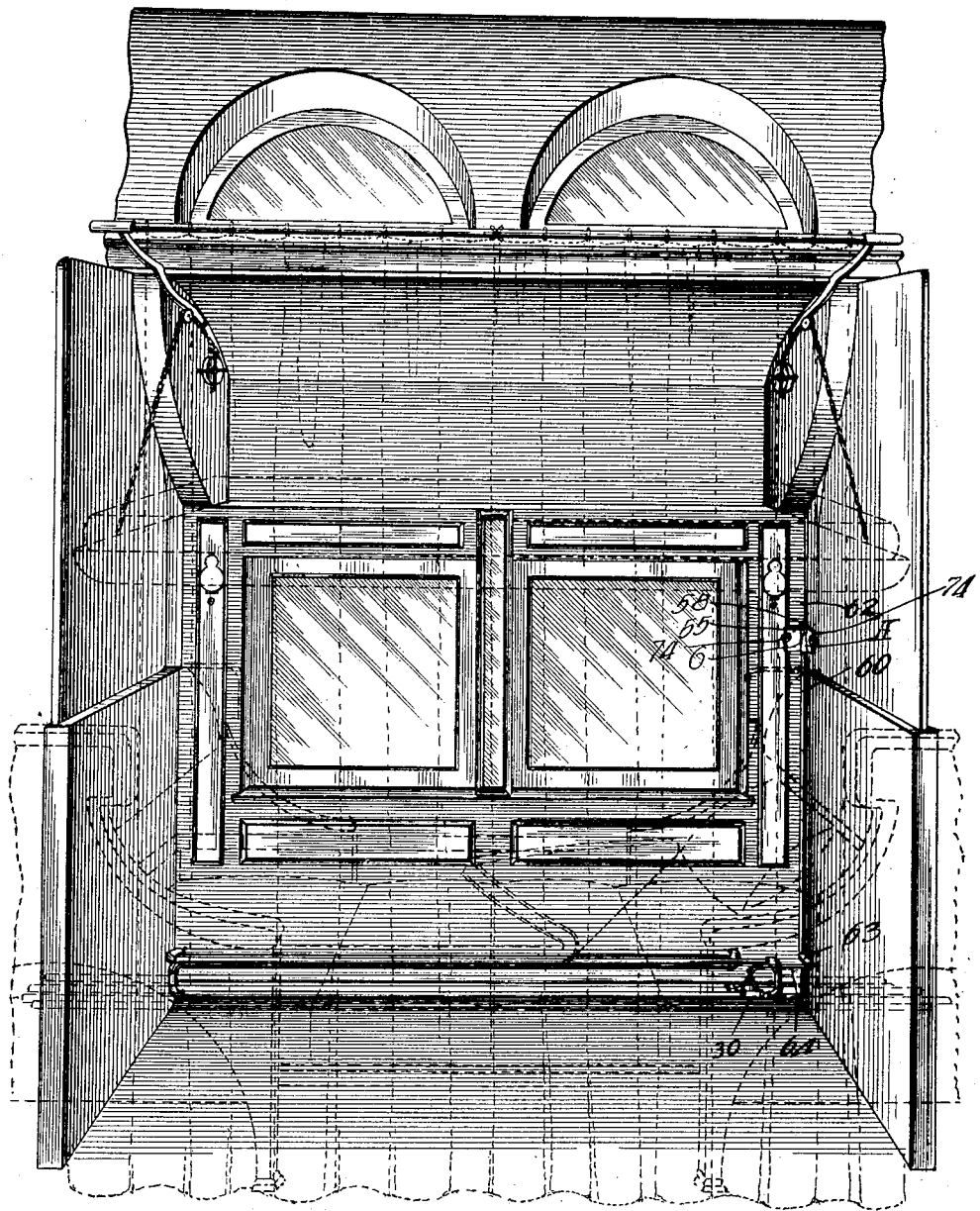
Fig. 2 is a view, in perspective, of one of the sections of the car.

In each of the sections of the sleeping car is arranged what may be termed a section radiating coil J and a four-way valve H', the latter being similar in construction to valve H, the four-way valve being interposed in the circuit of the main radiator D and between the radiator D and the inflow and outlet ends of the section radiator J. Valve H' is controlled by handle K arranged on the wall of the car so as to be within the reach of the person occupying the lower berth of the section when the section is made up, as shown in Fig. 2.

According to the preferred arrangement the section radiating coils are arranged in series with respect to the main radiating coil so that these subsidiary heating devices, or such of them as may be active, form a single circuit with the main coil. Furthermore, the section radiating coils tap the main coil at the return portion thereof so that when the steam is turned on by manipulation of valve H it will pass uninterruptedly through a circuit extending the entire length of the car, or substantially that, before entering any of the section radiators. This makes it certain that in case of shortage of supply of steam the general heating of the car and the protection of the water pipes and fixtures will be taken care of before additional heat is supplied to any of the sections. In the arrangement shown the steam from pipe section E passes through a pipe 25 to one end of the car, then through a return bend section 26 across the end of the car, then through a pipe 27 extending the entire length of the car, to a return bend section 28 at the other end, and thereafter through a line of pipe 29 in which the valve devices H' which control the separate section radiators are interposed.

In Figs. 3 to 12 inclusive, I have shown the construction of one of the four-way valves H (this valve in itself being of known type) together with the pipe and controlling devices for the valve. The valve comprises a casing 30 divided by webs 31, 32, 33 and 34 into four chambers 35, 36, 37 and 38, between which is arranged a cylindrical member 39 formed with openings 40 leading severally to the four chambers into which the interior of the valve casing is divided. The bottom 41 of the cylindrical member is formed with a drip opening 42 through which water of condensation may escape to an outlet pipe 43 which is tapped into a screw cap 44 in the bottom of the valve casing 30. The cylindrical member is held in place by a set screw 45 which extends through the wall of the casing and through web 34.

Within the cylindrical member 39 is arranged a revoluble valve comprising upper and lower discs 46, 47 connected by a vertical web 48, the valve being provided with an upwardly projecting stem 49. A spring 50 is interposed between the upper disc 46 and a bonnet 51, the bonnet having a cap 52 which encloses packing 53. Sections of the pipe 29 of the main radiating coil D lead to and from chambers 35, 36 of the valve device. The ends of the section coil J lead to and from the chambers 37 and 38, respectively. With the valve member 48 in the position shown in Figs. 5 and 6, the section radiating coil J is active. Steam entering chamber 35 from the pipe 29 of the main radiating coil D passes into chamber 38 through coil J to chamber 37 and to chamber 36 and then on through pipe 29. With the valve member turned to the position indicated in dotted lines in Fig. 5 the section radiating coil will be cut out and steam will flow directly through pipe 29 of the main radiator.

When the valve member is in the position indicated by the dotted lines, that is to say, in the position in which it cuts out the section radiator J, an opening 54 in the lower disc 47 of the valve member comes into register with the drip opening 42 in the bottom member 41 of the cylindrical inner casing 39, this position of the parts being shown in Fig. 9. A drip port is thereby provided for the condensation in the radiator J.

The handle K is located in the section in position to be easily reached by the person occupying the lower berth when the section is made up. The handle is formed with a forked portion 55 which is engaged by means of a pin 56 with a lug 57 formed on a collar 58 secured by pin 59 to the upper end of a vertical shaft 60 which passes through a bracket 61 secured to the wall 62 of the car at one corner of the section. On the lower end of the shaft 60 is an arm 63 connected by a link 64 to a lever 65 which is secured to a disc 66 on the end of the stem 49 of the four-way valve. The lever 65 is composed preferably of a plate 67 and a fork 68, these parts being offset so that the lever may be reversed, as indicated in Fig. 6, to allow some variation in the position of bracket 61 without changing the length of rod 60. The plate has lugs 69 on opposite sides of the same, one pair of which bear against the edge of disc 66, the plate being secured to the disc by screws 70. The link 64 has a flattened eye 71 which enters the slot 72 in the forked portion 68 of the lever and is pivoted to the lever by pin 73. The bracket 61 has two angularly disposed plates 74, 75 which bear legends "Open" and "Shut," indicating the position which the handle should take in order to open the section radiator or close it.

It will be understood that valve H may be in all respects like valve H' above described, except that the valve stem will be provided with an ordinary handle.

The operation of the apparatus will be apparent from the foregoing description but may be resumed as follows: When steam is turned on by opening valve H it will flow from the train pipe C through pipe E to the vapor regulator F and then through pipe section E', valve H and pipe section E² to the main radiating coil D, flowing through the sections 25, 26, 27 and 28 of the radiator before it reaches section 29 from which the section radiating coils J are supplied. If the occupant of any particular section desires heat in addition to that supplied by the main radiating coil he moves handle K from the position shown in Fig. 10 to the open position and steam from pipe 29 flows into the section radiator J through the four-way valve H', the medium passing from the discharge end of radiator J back into pipe 29 of the main radiator and then on through pipe 29, and such other section radiators as may be open, through the discharge pipe G, G' to the thermostat chamber of vapor regulator F. By this arrangement the heat in any section is modified to meet the requirements and desires of the occupant of that section without in any way interfering with the general heating of the car and the protection of water pipes and water fixtures from freezing.

I claim:

1. The combination with a sleeping car comprising an apartment divided into sections adapted to be made up at night as berths; of a heating system for the car comprising a source of supply of steam, a main radiating coil comprising a pipe adapted to receive steam from said source of supply and which extends uninterruptedly substantially the entire length of the car, a return pipe, separate radiating coils for the several sections of the car, respectively, the inlet and discharge ends of which are connected with the return pipe of the main coil, and means, in each of such sections for controlling the flow of medium from the return pipe of the main coil to the separate section coil of said section.

2. The combination with a sleeping car comprising an apartment divided into sections adapted to be made up at night as berths; of a heating system for the car comprising a steam train pipe, a main radiating coil having a pipe extending substantially the entire length of the car, and a return pipe, a supply pipe between the train pipe and said first named pipe, a vapor regulator interposed in said supply pipe, a discharge pipe connecting the discharge end of the return pipe to said vapor regulator, a separate radiating coil arranged in each of said sections, a four-way valve in each section interposed in the return pipe of the main coil, and between the inlet and discharge ends of the separate section coil, said valve adapted, in one position, to direct the medium in said return pipe through the separate section radiator while preventing flow directly through the return pipe at this point, and in another position adapted to close communication between the ends of the section radiating coil and the main coil while permitting the steam to flow directly through said return pipe, and means within reach of the occupant of the lower berth of said section for operating said valve.

3. In combination with a sleeping car of the type which comprises a space that in the day time forms a single apartment and at night is divided into a plurality of separately enclosed berth sections, a common heating coil which extends substantially the length of said apartment along one side of the same and near the floor, and comprises an inflow pipe and a return pipe, a vapor regulator comprising a valve at the inlet end of said inflow pipe and a thermostat for controlling said valve actuated by the medium outflowing from the return pipe, a plurality of auxiliary coils, one in each berth section, the inlet and return ends of each of which are connected with the return pipe of the common heating coil, a single valve device for each section which may be manipulated so that all of the medium in the return pipe of the common coil is either diverted through the auxiliary coil or is caused to pass directly through the common coil, by-passing the auxiliary coil, and a substantially vertical operating rod for each of the auxiliary coil valves having a handle within reach of the occupant of the lower berth of the section in which the auxiliary coil is located when said berth is made up.

EGBERT H. GOLD.